US006207208B1

(12) United States Patent
Irwin et al.

(10) Patent No.: US 6,207,208 B1
(45) Date of Patent: *Mar. 27, 2001

(54) ABSORPTIVE TREATMENTS FOR IMPROVED BEER FLAVOR STABILITY

(75) Inventors: Anthony J. Irwin, Worthington, OH (US); Robert L. Barker; Peter Pipast, both of London (CA)

(73) Assignee: Labatt Brewing Company Limited, London (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,249

(22) Filed: Jul. 6, 1998

Related U.S. Application Data

(60) Provisional application No. 60/061,541, filed on Oct. 7, 1997.

(51) Int. Cl.$^7$ ...................................................... A23L 1/025
(52) U.S. Cl. .......................................... 426/330.4; 426/592
(58) Field of Search .................................. 426/330.4, 16, 426/28, 600, 592

(56) References Cited

U.S. PATENT DOCUMENTS

| | | | |
|---|---|---|---|
| 2,452,968 | 11/1948 | Uihlein | ..................................... 99/48 |
| 3,676,367 | * 7/1972 | Raible | ................................... 252/451 |
| 3,867,551 | * 2/1975 | Jaegle | ...................................... 426/16 |
| 4,338,348 | * 7/1982 | Muller | ..................................... 426/600 |
| 4,389,421 | 6/1983 | Palamand | .......................... 426/330.4 |
| 4,820,420 | * 4/1989 | Hums et al. | .......................... 210/669 |
| 5,232,724 | * 8/1993 | Aldcroft et al. | ................... 426/330.4 |
| 5,582,857 | 12/1996 | Bordeleau et al. | ................ 426/330.4 |

OTHER PUBLICATIONS

Silbereisen et al, Abstract of Monatsschrift fuer Brauerei, 21 (8) pp. 221–235, 1968.*
Abstract of Pavlenko et al, Fermentnaya i Spirtovaya Promyshlennost, No. 2, 17–19, 1979.*
Tamer et al., Enzyme Microbial Technology 10:754–756, Dec., 1988.
Verzele, M. et al., J. Inst. Brew. 73:255–257, 1967.
Sakuma et al., "Sunstruck Flavor Formation in Beer," American Society of Brewing Chemists, Inc., 162–165, 1991.

\* cited by examiner

*Primary Examiner*—Curtis E. Sherrer
(74) *Attorney, Agent, or Firm*—Levy & Grandinetti

(57) ABSTRACT

A process for reducing the propensity of riboflavin-containing malt beverages employs the treatment of beer or its intermediates with Fuller's earth absorbents and, in particular, colloidal magnesium aluminum silicates, especially attapulgite and montmorillonite clays. This process effects absorbance of riboflavin contained in such beer or its intermediates and can be shown to improve the stability of a treated beer against the formation of skunky off-flavors following exposure to visible wavelengths of light.

6 Claims, No Drawings

US 6,207,208 B1

ABSORPTIVE TREATMENTS FOR IMPROVED BEER FLAVOR STABILITY

This application claims the benefit of U.S. Provisional No. 60/061,541 filed Oct. 7, 1997.

BACKGROUND OF THE INVENTION

1. Field of the Invention

The present invention relates to hopped malt beverages, especially alcoholic brewery beverages produced at least in part from malt, and to improvements in the flavor stability thereof. More particularly, the present invention relates to imparting to hopped malt beverages improved stability against the production of thiols associated with a "skunky" odor and flavor development in beer that has been exposed to visible light.

2. Description of Related Art

As is well known and accepted in the malt beverage brewing art, subjecting a hopped malt brewery beverage, especially an alcoholic hopped malt brewery beverage such as lager, ale, porter, stout, and the like (herein generically referred to as "beer"), to sunlight or artificial light causes a significantly deleterious effect on the sensory qualities of the beverage by generating a so-called "skunky" flavor, which is sometimes also referred to as "sunstruck" or "light struck" flavor. It is known that the skunky flavor is the result of photochemical changes in the beverage that produce volatile sulfur-containing compounds. These sulfur compounds are thought to be formed at least in part by the reaction of other sulfur-containing compounds with photochemically degraded hop components in the beverage. Only very small amounts of these sulfur compounds are required to be present to impart the skunky flavor to the beverage and render it unacceptable.

The photochemical reaction is assisted by the presence of riboflavin, one of several photo-sensitizers in the beverage. The riboflavin emanates mainly from the malt, and to a minor extent via the hops, used in the production of beer and, according to common wisdom, action of yeast during the fermentation. (See Tamer et al. *Enzyme Microb Technology* 10:754–56, December 1988.) This photochemical reaction is a problem that to some degree has been the subject of a diverse remediation.

An approach that relies on primary packaging coloration either to exclude light or, at least, exclude those wavelengths of light that are particularly problematic, has been widely adopted. Such attempts to prevent beverages from becoming skunky involve enclosing the beer in cans or bottles made of protective, i.e., colored, glass, brown or amber being most efficient (see U.S. Pat. No. 2,452,968). These bottles reduce or eliminate the transmission to the beverage of light of wavelength shorter than about 560 nanometers. Such light is most harmful because it assists the riboflavin in enhancing the production of the undesirable volatile sulfur compounds.

Brown bottle glass has become a standard for the brewing industry for the purpose of avoiding the formation of skunky off-flavors, although in some circumstances green glass can be employed, generally with reduced efficacy.

Flint, or clear, glass—apart from the exclusion of the preponderance of ultraviolet wavelengths—is ineffective as packaging for traditional beer products that are susceptible to the formation of skunky off-flavors on exposure to visible wavelengths. In order to enjoy the visual aesthetic that is associated with this type of primary packaging (for example, the variously red, golden, or brown coloration and clarity of the beer beverage), the brewer is faced with the option of employing reduced hop extracts or taking the risk of the formation of skunky flavor. The skunky off-flavor, as previously stated, is, problematic. The use of reduced hop extracts, on the other hand, does not deliver the "noble" hop essences to the beverage that are associated with traditional beer products.

Another method developed to address the problem of "skunky" flavor production uses reduced isohumulones in place of hops or hop extracts. (See Verzele, M., et al., *U. Inst. Brew.* 73:255–57, 1967.)

Other methods involve adding light-stabilizing materials to the beverage. (See U.S. Pat. No. 4,389,421.) However, in some jurisdictions, the use of such compounds has not been approved. Further, many brewers are reluctant to use any additives at all but, rather, use hops or hop extracts in an effort to achieve traditional beer flavor.

Another alternative has been suggested by U.S. Pat. No. 4,389,421. This patent describes malt beverages that have added organic compounds possessing a 1,8-epoxy group and, optionally, another compound with a 1,4-epoxy group. The amount of the 1,8-epoxy compound is at least 0.25 ppb and, preferably, about one to six ppb by weight. Suitable sources of the 1,8-epoxy compounds are taught as including 1,8-cineole, or plant essences from cardamom, eucalyptus, peppermint, lavender, laurel, or star anise. A suitable 1,4-epoxy compound is 1,4-cineole. The addition of these compounds is taught as preventing the development of the "light struck" flavor in a range of malt beverages (for example, beer, ale, malt liquors, etc.).

The problem of skunky flavor has been the subject of research for many years, and such research continues. (See Sakuma et al., "Sunstruck Flavor Formation in Beer," *American Society of Brewing Chemists, Inc.*, 162–65, 1991). This article also deals with the part believed to be played by riboflavin in the reaction that produces the "skunky" flavor and suggests that removing riboflavin from the finished beer may solve the problem. However, an acceptable means for achieving that suggestion has not been readily apparent, and the problem persists.

In accordance with currently accepted brewing science, the compound that is thought to be primarily responsible for this skunky off-flavor is 3-methyl-2-butene-1-thiol. The compound is believed to be formed when photochemical cleavage of side chains of hop-derived isohumulones is followed by the reaction of the resulting 3-methyl-2-butenyl radical with an undetermined sulfur-containing compound that is normally present in beer. Riboflavin, which is contributed from both vegetable and, to a much lesser extent, yeast sources, is generally accepted as being a photochemical sensitizer in this reaction sequence.

SUMMARY OF THE INVENTION

In accordance with the present invention, it has been found, in the production of a hopped malt beverage, that if riboflavin is substantially absent or present in only a relatively small or "insignificant" amount in a process liquid, then the resulting beverage has enhanced stability against light and less tendency to produce skunky off-flavors.

Wort produced in the usual manner from malt(s) typically has a relatively high riboflavin content (for example, about 0.4 ppm or more). As used herein, riboflavin contents above 0.2 ppm are defined as "high." In accordance with the present invention, the riboflavin content is reduced to less than 0.2 ppm, that level being defined for use herein as an "insignificant" amount.

The present invention provides a process for the production of a hopped malt beverage comprising hopping a process liquid with a high riboflavin content and treating the process liquid with an effective amount of an absorbent clay to absorb the riboflavin. The riboflavin content is reduced to less than about 0.2 ppm, and the resulting hopped malt beverage has enhanced stability to light.

In another aspect, the present invention relates to a hopped malt beverage with enhanced light stability prepared by a process comprising treating a process liquid having a high riboflavin content with an effective amount of an absorbent clay to absorb the riboflavin. The riboflavin content is reduced to less than about 0.2 ppm, resulting in a hopped malt beverage with enhanced stability to light.

DESCRIPTION OF THE PREFERRED EMBODIMENTS

In the process of the present invention, an absorbent clay is added to the process liquid of a brewing process to absorb, and thereby remove, riboflavin present in the process liquid.

As employed herein, the term "process liquid" means any unhopped wort, fermented wort (including green or bright beer), or finished beer produced using malt.

Riboflavin is a photo-sensitizer for the photochemical cleavage of side chains of the isohumulones that are also present in the process liquid to yield 3-methyl-2-butenyl radicals that react with a sulfur-containing compound in the brew to produce thiols, for example, 3-methyl-2-butene-1-thiol, which have a skunky aroma. In the absence of the riboflavin initiator, the rate of photochemical reaction is significantly reduced, and the light stability of the product is thereby improved.

The present invention has special application to the production of a beer having enhanced stability to light. This stability can lead to an extended shelf life of 25 percent or more than is typical for regular, untreated beer in situations where incident light causes deterioration of the product.

In a preferred embodiment of the invention, an improved process is provided for the production of a beer in which process a process liquid having a high riboflavin content is hopped to produce the desired beverage, wherein the improvement comprises treating the process liquid with an effective amount of a clay absorbent, whereby the riboflavin content in the process liquid is reduced to less than 0.2 ppm, and the resulting beer has enhanced stability to light.

It is believed that reducing the amount of riboflavin to a relatively low level prior to hopping inhibits the formation of sulfur compounds imparting a "skunky" flavor and, hence, is responsible for the enhanced light stability.

Moreover, it has also been found that if, as in one embodiment of the present invention, the amount of riboflavin is reduced prior to the fermentation stage of the brewing process (for example, in the unhopped wort), the same beneficial result is achieved.

It is preferred that at least 90 percent, more preferably 95 percent, and most preferably substantially all, of the riboflavin be removed from the process liquid either prior to or after hopping, although reductions in excess of as little as 50 percent can be useful. In practice, this means the process liquid, if it is wort, may have a maximum riboflavin content of less than about 0.2 ppm, preferably less than about 0.1 ppm, and more preferably less than about 0.05 ppm after treatment. It also means that the process liquid, if it is a fermented liquid, may have a maximum riboflavin content of less than about 0.15 ppm, preferably less than about 0.1 ppm, more preferably less than about 0.07 ppm, and most preferably less than about 0.03 ppm after treatment.

The desired hopped malt beverage can be produced using generally well-known brewing procedures adapted, where necessary, to incorporate the required riboflavin reduction stage, preferably by the absorption treatment of the present invention at an appropriate stage. Consequently, an all-malt or a malt-plus-adjunct combination can be used as a starting substrate, as desired.

Beer not treated by the process of the present invention which has been bottled in clear flint glass, green glass, and the like, and subjected to strong light, for example, sunlight or artificial light indoors, can develop an unacceptable skunky flavor within minutes, often as fast as 20 minutes. The skunky flavor is readily discernible by experienced taste panelists who routinely make quality control evaluations in beer products. Such panels have descried that beverages treated by the process of the present invention do not develop the same degree of skunky flavor for about 16 hours and, in fact, may not do so for as long as 20 to 30 hours or more.

Generally, hops or hop pellets are used to ensure that the "traditional" beer taste is obtained. Although there is a small amount of riboflavin in hops and hop pellets, it is insignificant as taught herein. However, even that small riboflavin content could be removed if desired. Moreover, hop extracts can be substituted for the hops or hop pellets. Such extracts do not contain any riboflavin and, hence, can be used to advantage in the present invention.

Additionally, the yeast pitched to commence fermentation may include some small amount of riboflavin, but, again, this amount should not be sufficient to affect the present invention adversely. However, it is advantageous to use a yeast that is substantially free of riboflavin or at least is riboflavin-deficient.

The clay employed as the absorbent in the practice of the present invention will be a hydrated aluminum silicate or a hydrated aluminum-magnesium silicate. Examples of such clays that can be used include Fuller's earth, bentonite, kaolinite, illite, and halloysite, as well as mixtures thereof.

Fuller's earth is a porous colloidal aluminum silicate clay having as a chief ingredient attapulgite, a hydrated aluminum-magnesium silicate of the general structure $(MgAl)_5Si_8O_{22}(OH)_4 \cdot 4H_2O$.

Bentonite is a colloidal aluminum silicate clay composed chiefly of montmorillonite, of which there are two varieties: Na bentonite, which has a high swelling capacity in water, and Ca bentonite, which has a negligible swelling capacity. The general structure of montmorillonite is $Al_2O_3 \cdot 4SiO_2 \cdot H_2O$.

Preferably the clay is attapulgite, montmorillonite, or mixtures thereof.

The clay is added to the process liquid in an amount effective to absorb all, or at least a majority, of the riboflavin present in the liquid. The actual concentration employed will be dependent upon a number of factors, including the chemical and physical, for example, porosity, characteristics of the particular clay chosen. The actual amount required in a given case can be readily determined by a person of ordinary skill in the art without undue experimentation. Generally, the amount will lie in the range of from about 0.1 to about 60, and preferably from about 1 to about 30.

The process of the present invention can be used in any known commercial brewing process, including both batch and continuous processes. It can also be used in combination with other means for reducing riboflavin content, such as the means described in U.S. Pat. No. 5,582,857, incorporated herein by reference.

The advantages and the important features of the present invention will be more apparent from the following example.

EXAMPLE

A concentrated lager beer was brewed from a 16° Plato wort. Veegum™ clay (R. T. Vanderbilt) is a complex magnesium aluminum silicate that forms a colloidal thixotropic gel on hydration. Various amounts of this clay were added to the dilution water that was subsequently used to dilute the high gravity brew to the desired end-product concentration. The addition was facilitated by bubbling $CO_2$ through the water/clay dispersion for about thirty minutes.

The concentrated lager was then diluted with the water/hydrated clay diluent, and the mixture was allowed to rest (i.e., with the beer in contact with the hydrated clay absorbent) for 30 to 60 minutes. Thereafter, the clay was filtered off, and the beer was packaged in clear flint bottles.

The packaged beer was then exposed to light for twenty-four hours in a light chamber, assessed by a trained taste panel, and analyzed for riboflavin concentration. The riboflavin concentration was measured using HPLC techniques, employing a Spectrophysics SP100LC and $C_{18}$ reversed phase column. The detection system employed a Waters Scanning Fluorescence Spectrophotometer.

The trained taste panel rated the beer on a scale of 1 through 10, in which the highest score, 10, was representative of an intense light struck flavor, while a score of 1 represented an absence of perceptible light struck flavor development. The panel results were averaged, and both the panel tasting and riboflavin analyses were carried out for light-exposed and unexposed control beers, as well as beers treated in accordance with the present invention to levels of Veegum clay of 30 and 5 grams per liter, respectively. The results are set out in Table 1.

TABLE 1

| Beer (Lager) | Clay Concentration | Average Taste Panel Score | Exposure Time (Hours) | Riboflavin Concentration |
| --- | --- | --- | --- | --- |
| Control Unexposed | 0 g/l | 1 | 0 | 0.266 |
| Control Exposed | 0 g/l | 7.8 | 24 | 0.266 |
| Treated Exposed | 30 g/l | 1 | 24 | 0 |
| Treated Exposed | 5 g/l | 1 | 24 | 0.024 |

At the clay treatment levels set out in this Example, no skunky off-flavors were detected by the panel for either of the two treated beers, even though nine percent of the native riboflavin was left in the beer that had only been treated with five g/l of clay absorbent.

The invention has been described in detail with particular reference to preferred embodiments thereof, but it is understood that variations and modifications can be effected within the spirit and scope of the invention.

What is claimed is:

1. A process for reducing the riboflavin content of a hopped malt beverage having a riboflavin content above 0.2 ppm comprising:
   A. selecting a hopped malt beverage having a riboflavin content above 0.2 ppm; and
   B. treating the beverage by suspending therein from 5 to about 30 grams per liter of an absorbent clay selected from the group consisting of hydrated aluminum-magnesium silicates for from thirty to sixty minutes to absorb the riboflavin;
   whereby the riboflavin content is reduced to less than about 0.2 ppm, resulting in a hopped malt beverage with enhanced stability to light.

2. The process of claim 1 wherein the hopped malt beverage is beer.

3. The process of claim 1 wherein the riboflavin content is reduced to less than about 0.1 ppm.

4. The process of claim 3 wherein the riboflavin content is reduced to less than about 0.07 ppm.

5. The process of claim 4 wherein the riboflavin content is reduced to less than about 0.03 ppm.

6. The process of claim 1 wherein the clay is Fuller's earth consisting essentially of attapulgite.

* * * * *